United States Patent [19]

Buhl et al.

[11] Patent Number: 5,369,684
[45] Date of Patent: Nov. 29, 1994

[54] APPARATUS AND METHOD FOR DIRECTING CALLS TO MOBILE STATION SUBSCRIBERS

[75] Inventors: Nancy Buhl; John Hayes, both of Montreal, Canada; Harald Kallin, Sollentuna, Sweden

[73] Assignee: Telefonaktiebolaget LM Ericsson, Stockholm, Sweden

[21] Appl. No.: 194,872

[22] Filed: Jan. 13, 1994

Related U.S. Application Data

[63] Continuation of Ser. No. 765,487, Sep. 25, 1991, abandoned, which is a continuation of Ser. No. 515,836, Apr. 27, 1990, abandoned.

[51] Int. Cl.⁵ ............................................. H04M 11/00
[52] U.S. Cl. ......................................... 379/59; 379/60; 455/33.1
[58] Field of Search ................. 379/56, 57, 58, 59, 379/60, 63; 455/33.1, 33.2, 33.3, 33.4, 54.1, 54.2, 56.1

[56] References Cited

U.S. PATENT DOCUMENTS

| 487,738 | 10/1989 | Selby | 379/60 |
|---|---|---|---|
| 4,228,319 | 10/1980 | De Jager et al. | 379/60 |
| 4,612,415 | 9/1986 | Zdunek et al. | 379/59 |
| 4,644,351 | 2/1987 | Zabarsky et al. | 340/825.44 |
| 4,700,374 | 10/1987 | Bini | 379/60 |
| 4,737,978 | 4/1988 | Burke et al. | 379/60 |
| 4,748,655 | 5/1988 | Thrower et al. | 379/60 |
| 4,794,635 | 12/1988 | Hess | 379/63 |
| 4,815,073 | 3/1989 | Grauel et al. | 370/95 |
| 4,827,499 | 5/1989 | Warty et al. | 379/58 |
| 4,833,701 | 5/1989 | Comroe et al. | 379/60 |
| 4,833,702 | 5/1989 | Shitara et al. | 379/60 |
| 4,843,622 | 6/1989 | Yotsutani et al. | 379/59 |
| 4,881,271 | 11/1989 | Yamauchi et al. | 455/56 |
| 4,890,315 | 12/1989 | Bendixen et al. | 379/59 |

FOREIGN PATENT DOCUMENTS

| 0167458 | 4/1985 | European Pat. Off. |
| 2193861 | 2/1988 | United Kingdom . |

OTHER PUBLICATIONS

M. Ballard, E. Issenmann; Digital Cellular Mobile-Radio System ECR900; European Transactions on Telecommunications and related technologies, vol. I-N.1, Jan.-Feb. 1990.

A. Eizenhofer, H. Pfannschmidt; Philips Kommunikations Industrie AG, Nurnberg; Integration of Services in the Digital Mobile Teelphone System MATS-D.

*Primary Examiner*—Curtis Kuntz
*Assistant Examiner*—Dwayne D. Bost
*Attorney, Agent, or Firm*—Johnson & Gibbs

[57] ABSTRACT

The present invention provides a mobile communications system in which the home exchange of a mobile subscriber maintains information indicative of where the mobile subscriber might be found, Upon receipt of a call, the home exchange requests the exchange where the mobile is believed to be located to page it and then requests the answering exchange(s) to order the mobile to tune to a voice/traffic channel. Only after the successful completion of this process does the answering exchange report this to the home exchange which then orders routing of the call through the network.

26 Claims, 2 Drawing Sheets

APPARATUS AND METHOD FOR DIRECTING CALLS TO MOBILE STATION SUBSCRIBERS

This is a continuation of application Ser. No.07/765,487, filed Sep. 25, 1991, now abandoned, which is a continuation of application Ser. No. 07/515,836, filed Apr. 27, 1990, now abandoned.

CROSS REFERENCE TO RELATED APPLICATION

This application is related to the U.S. patent application entitled "MULTI-EXCHANGE PAGING SYSTEM FOR LOCATING A MOBILE TELEPHONE IN A WIDE AREA TELEPHONE NETWORK", Ser. No. 07/516,122 filed on even date herewith and assigned to the assignee of the present invention, which application is hereby incorporated herein by reference.

BACKGROUND OF THE INVENTION

1. Field of the Invention

This invention relates generally to communications systems having mobile subscribers and, more particularly, to a method for routing calls to such mobile subscribers.

2. History of The Prior Art

In certain communications systems, such as in some radiotelephone systems, the entire service area of a system is divided into a number of local service areas or exchanges. In each local area, radio access units are located at one or more key points to establish radio links between mobile subscribers and mobile switching centers. Each mobile subscriber is permanently assigned a unique telephone number recognized by the public switched network. Thus, calls to a particular mobile subscriber are routed to an interrogation exchange which consults the home exchange of that particular subscriber to obtain information regarding where the call should be routed in order to reach the mobile subscriber. If the mobile subscriber cannot be reached at the location to which the call was routed the call is lost and the resources of the communications network have been occupied unnecessarily.

Although there are no known prior art teachings of a solution to the aforementioned deficiencies and shortcomings of prior art mobile communications systems, a number of prior art references exist that discuss subject matter that relates to the subject matter of the present application. Exemplary of such prior art references are U.S. Pat. Nos. 4,228,319, 4,612,415, 4,748,655, 4,794,635, 4,833,701, and 4,833,702. Each of these references is discussed briefly below.

U.S. Patent No. 4,228,319 to De Jager et al. relates to an automatic mobile subscriber system. De Jager et al. teach stationary stations which repeatedly transmit through their cell channel a channel number of a free duplex speech channel which is stored in memory in mobile stations receiving the call channel. De Jager et al. also teach use of the stored channel number for automatically selecting the free duplex speech channel in response to a connection set-up command.

U.S. Pat. No. 4,612,415 to Zdunek et al. relates to a method and means for controlling telephone interconnect traffic in a trunked radio system. Zdunek et al. teach continuously monitoring all types of communication traffic on the system and, in response to an increasing dispatch access delay, reserving certain repeaters for dispatch use only during a predetermined period. Zdunek et al. also teach a system in which the number of simultaneous telephone interconnect calls permitted on the system during the predetermined period is dynamically altered in response to system loading. Still further, Zdunek et al. teach establishment of a variable, periodically updated, maximum interconnect call length based on the current system dispatch access delay.

U.S. Pat. No. 4,748,655 to Thrower et al. relates to portable telephones. According to the teachings of Thrower et al., a personal portable telephone allows a user access to a cellular radio network via a number of different gateways including a communal unit, a user's mobile telephone set, a home telephone or an office PABX. The telephone can also be used as a paging unit for use within the cellular radio network. The communal radio unit is a multi-channel arrangement capable of servicing a large number of personal telephones within its service area which is small compared to that of a normal cellular radio cell. The communal units may be transportable and located in public -areas such as railway stations, airports and on trains or coaches. The telephone automatically transmits its identification number to a gateway when it enters its service area enabling the subscriber to be accessed by callers without knowing his whereabouts.

U.S. Pat. No. 4,794,635 to Hess teaches a two-way radio communication system having a limited number of channels which assigns calls according to a max-minimum method. Hess' method also ascertains the type of call, handoff or first assignment, and assigns a server with a given central controller to a channel frequency within the requestor sector that minimizes interference to present users. In a second embodiment of his method, Hess teaches requesting assignment to a limited number of channels to reduce adjacent channel interference to and from the requestor with respect to present users operating on a system by utilizing one or more thresholds to arrange channel assignments based upon progressively larger or smaller values of received signal strength.

U.S. Pat. No. 4,833,701 to Comroe et al. relates to a trunked communications system with nationwide roaming capability. According to the teachings of Comroe et al., selected regional trunking systems are equipped with telephone interchange capability and provided with local computers, which communicate with a national hub computer. At each selected trunking system, several ID's are reserved as "roaming ID's" to be temporarily assigned to roaming subscribers. When a subscriber determines that he has roamed into a new trunk system, he requests a roaming ID. A roaming ID is assigned and transmitted to the subscriber, which thereafter operates within the new trunked system using its roaming ID. The roaming assignment is also transmitted to the national hub computer so that interconnect calls may be properly forwarded. The roaming subscriber continues to operate under the assigned roaming ID until it roams out of range of the current system and into yet another trunked system In this way, the subscriber may roam from system to system.

U.S. Pat. No. 4,833,702 to Shitara et al. relates to telephone registration and cancellation control in a wide area cordless telephone system. Specifically, Skitara et al. teach a method for making a registration of a roaming cordless telephone in one of a plurality of local service areas and cancelling the registration.

SUMMARY OF THE INVENTION

In order to overcome the deficiencies and shortcomings of the prior art discussed above, the present invention, in one aspect thereof, provides a mobile communications system in which the home exchange of a mobile subscriber maintains information indicative of where the subscriber might be found. The home exchange receives a request to locate a specific subscriber for the completion of a call to it. In order to route an incoming call, to the exchange where the subscriber is currently located, the home exchange explicitly locates the mobile subscriber before answering the request. The term "explicitly locate", as used herein, means that the mobile is paged and a response is received from the mobile. It may further imply that a designation order for a specific voice channel has been sent to the mobile and a confirmation to the voice channel designation has been received from the mobile. The process of performing routing only after explicitly locating the called subscriber is a radically new concept to telephony, greatly increasing the success rate of calls to mobile subscribers and reducing the unproductive use of costly network resources.

In one aspect of the present invention there is a mobile communications system in which at least one mobile station may roam. The system includes a home exchange of the at least one mobile station and at least one visited exchange having a coverage area in which the mobile station may roam. An interrogation exchange receives incoming calls for the mobile station and requests information from the home exchange as to where to route the incoming call. Before returning this information to the interrogating exchange, the home exchange requests the exchange where the mobile is believed to be currently located to page the mobile. The paging exchange then pages the mobile in an area where the mobile may possibly be found, this area is not necessarily defined by or restricted to the boundaries of the paging exchange. Upon reception of a page response from the paged mobile, and after possible voice channel designation, the location of the mobile is reported to the home exchange. The home exchange then informs the interrogation exchange of the mobile's location for routing and completion of the call.

In another aspect of the invention, the page response of a mobile need not be received in the actual paging exchange in order to explicitly locate the mobile. Any exchange which can determine the mobile subscribers home exchange can inform the home exchange that a page response has been received from the mobile and that the mobile has been confirmed on a voice channel and is awaiting the completion of an incoming call.

In a still further aspect of the invention, the home exchange need not be an exchange at all, but instead a memory for storing subscriber data such as a home location register (HLR).

As a note, interrogation exchange is logically separate from the home and/or visited exchanges but may physically be the same entity.

In still another aspect of the invention, a mobile communications system includes at least one mobile subscriber, a home exchange associated with the mobile subscriber and one or more additional exchanges within which the mobile subscriber may be presently located. There is also means within the home exchange or within a home location register for maintaining information relating to the exchange within which the mobile subscriber may also be located. A paging means is responsive to initiation of a call directed to the mobile subscriber and selectively pages the mobile subscriber in the registered exchange and possibly one or more additional exchanges. A reporting means is responsive to the paging means and determines the present exchange within which the mobile subscriber is presently located and reports that present exchange to the home exchange. A routing means is contained within the registered exchange and is responsive to the reporting means for routing the call to the mobile subscriber within the reported present exchange.

An object of the present invention is to more efficiently and more accurately route incoming calls to mobile subscribers.

BRIEF DESCRIPTION OF THE DRAWINGS

For a more complete understanding of the present invention, and for further objects and advantages thereof, reference may now be had to the accompanying description taken in conjunction with the accompanying drawings in which.

DETAILED DESCRIPTION

Figure 1:
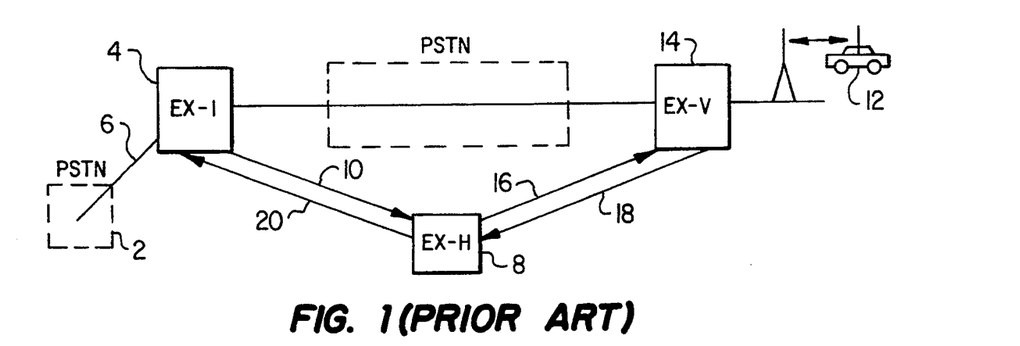
FIG. 1 is a block diagram of a prior art "route first-page later" system of call routing for automatic roamers.

Referring now to FIG. 1, a prior art "Route First - Page Later" call roaming system is shown therein. In such a system, an incoming call from the PSTN 2 is routed to an interrogation exchange 4 via a voice line 6. Part of the information transmitted from the PSTN to the interrogation exchange 4 is information regarding the identity (the "B-number") of the callee (the "B-subscriber"); as opposed to the caller (the "A-subscriber"). From the B-number, the interrogation exchange 4 determines the B-subscriber's home exchange 8 and, via signalling line 10, the interrogation exchange 4 asks the home exchange 8 for a routing/roaming number. If the subscriber is roaming, e.g., in the area served by visited exchange 14 in FIG. 1, the visited exchange 14 is asked for a routing number by the home exchange 8 via signalling line 16. This routing number is then returned to the home exchange 8 via signalling line 18. The routing number is passed from the home exchange 8 to the interrogation exchange 4 (as indicated by signalling line 20) which thereafter routes the call to the visited exchange 14 (possibly through the PSTN as shown). When the visited exchange 14 receives the incoming call, paging of the mobile 12 is started.

If the mobile station 12 does not reply with a page response, or if there are no available voice channels or the subscriber is busy and does not have "call waiting", the routing and use of voice lines from the interrogation exchange to the visited exchange has been in vain. The call failure information could have been indicated to the A-subscriber from the interrogation exchange 4 instead, with a substantial savings in transmission costs between the interrogation and the visited exchange.

It should be appreciated that the above-described procedure incorporates the classical telephonic principle of "route first-ring later" which is applicable in ordinary telephony when the subscriber is not more than a device at the end of a wire and ringing is not initiated before the call is routed. In mobile telephony, however, this principle is not a completely valid assumption since there are several steps that must be taken after an incoming call is received and before ringing can start. Examples of these steps include paging of the mobile station and assignment of a voice channel to it.

Figure 2:
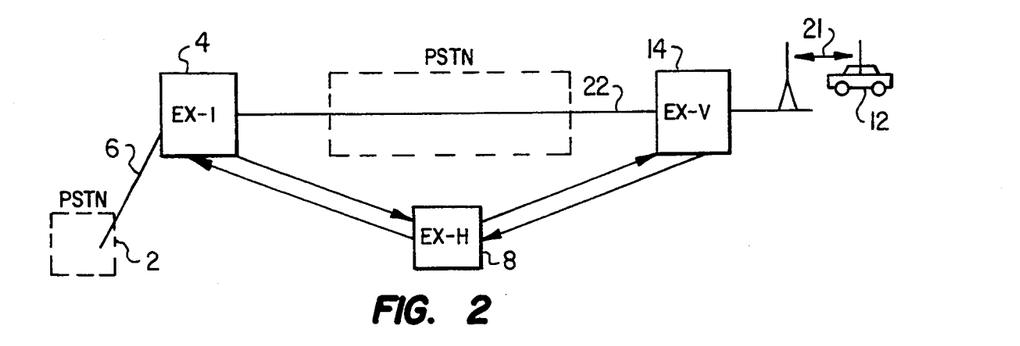
FIG. 2 is a block diagram of a routing system according to the teachings of the present invention.

In the routing procedure incorporated into the present invention, routing of a call does not take place before the mobile station is explicitly located and it is verified that it can accept the call. This process is illustrated in FIG. 2. As with the case of the prior art "route first-page later" system described with reference to FIG. 1, in the routing system shown in FIG. 2, an incoming call from the PSTN is routed to an interrogation exchange 4 via a voice line 6. The interrogation exchange 4 analyzes the B-number and asks the home exchange 8 for a routing/roaming number. If the subscriber 12 is roaming, the visited exchange 14 is asked for a routing number. At this point, the routing system shown in FIG. 2 and the "route first-page later" system shown in FIG. 1 begin to differ. The major change between the two systems is that when the visited exchange 14 gets a request for a roaming number, instead of immediately returning a roaming number to the home exchange 8, the visited exchange 14 starts to page the mobile station 12. In FIG. 2, this paging is indicated by the shaft and right head of double-headed arrow 21. If the visited exchange 14 succeeds in finding the mobile station 12 (said "finding" indicated by the shaft and left head of double-headed arrow 21), and possibly putting it on a voice channel, this condition is reported back to the interrogation exchange 4 through the home exchange 8 and the process of routing the call to the visited exchange 14 starts over line 22. Otherwise, the fact that the call has failed and the reason for that failure is reported back to the home exchange 8 and suitable measures can then be taken, e.g. , "transfer on no-reply", "transfer on busy", and so on. The interrogation exchange 4 is capable of providing necessary actions with respect to the incoming caller.

If the mobile station 12 was located and placed on a voice channel and the call routed to the visited exchange 14, ringing is then initiated toward the mobile station 12.

As those skilled in the art should appreciate, the scheme described immediately above and shown in FIG. 2 does not delay call setup. Rather, it allows a substantial savings in transmission costs between the interrogation exchange 4 and the visited exchange 14 when there is no end use to be achieved in routing the call to the visited exchange 14.

With the changed paging/routing strategy set forth in connection with the system of FIG. 2, the home exchange 8 knows the outcome of the paging of the subscriber 12 before call routing begins. If the outcome is negative, e.g., the mobile station 12 does not respond to its page(s) within a preselected period of time or there are no available voice channels, the reason for the call failure is supplied to the interrogation exchange 4. This information is handled by the interrogation exchange directly, thereby reducing the overall cost of the call attempt by the cost of routing the incompleteable call.

Figure 3:
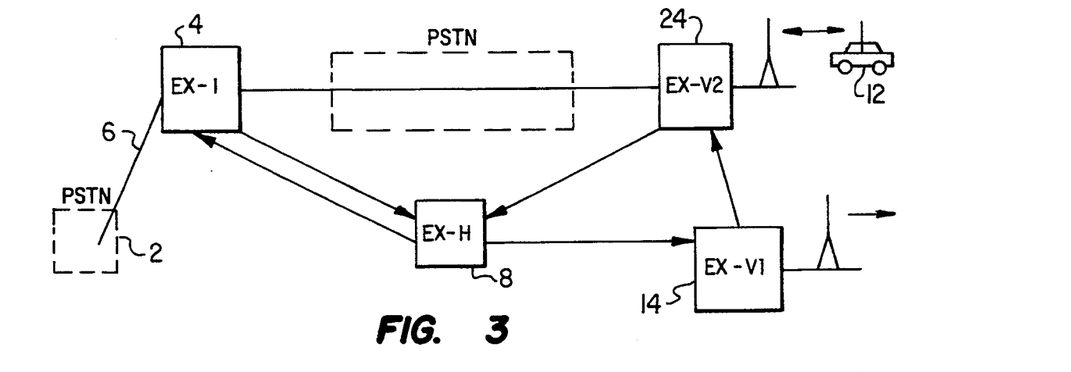
FIG. 3 is a block diagram illustrating extended area paging in a routing system according to the teachings of the present invention.

Referring to FIG. 3 the routing process shown in FIG. 2 is used but with the additional feature of extended area paging in which the visited exchange may inform another exchange to also page the mobile. Whichever exchange receives a page response from the mobile will inform the home exchange that the mobile has been explicitly located. The call is then routed to the mobile as described earlier.

In this situation, the exchange which receives the page request determines, based on the last known location of the mobile, what is the most desirable area to page. Such a paging area may or may not cover the entire area of this exchange. In addition, this desired paging area may also cover areas of bordering exchanges. If this is the case, then the exchanges controlling these extended paging areas must be informed to page the mobile. Referring to FIG. 3, the page request could be sent directly from $V_1$ to $V_2$. An alternative is for V1 to inform the home exchange that paging should also be performed in an extended paging area controlled by V2. The home exchange could then relay this order to $V_2$, where paging could commence.

Figure 4:
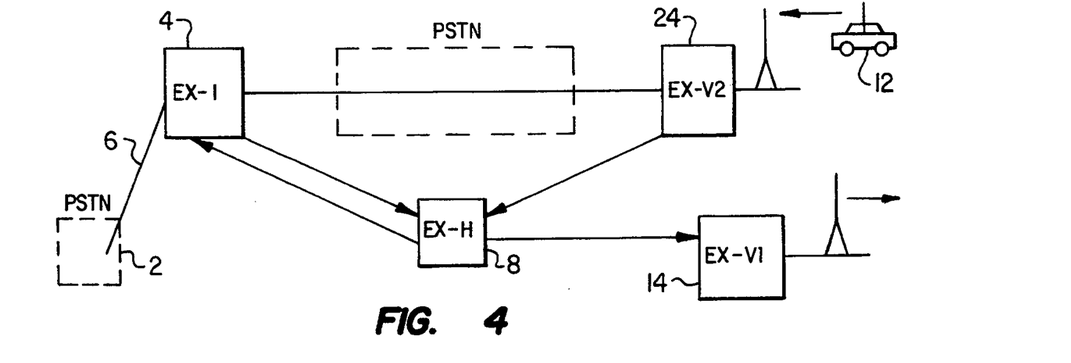
FIG. 4 is a block diagram illustrating reception of a page response in a non-paging exchange in a routing system according to the teachings of the present invention; and, FIG. 5 is a flow diagram depicting the steps of a method employed in the present invention.
Figure 5:
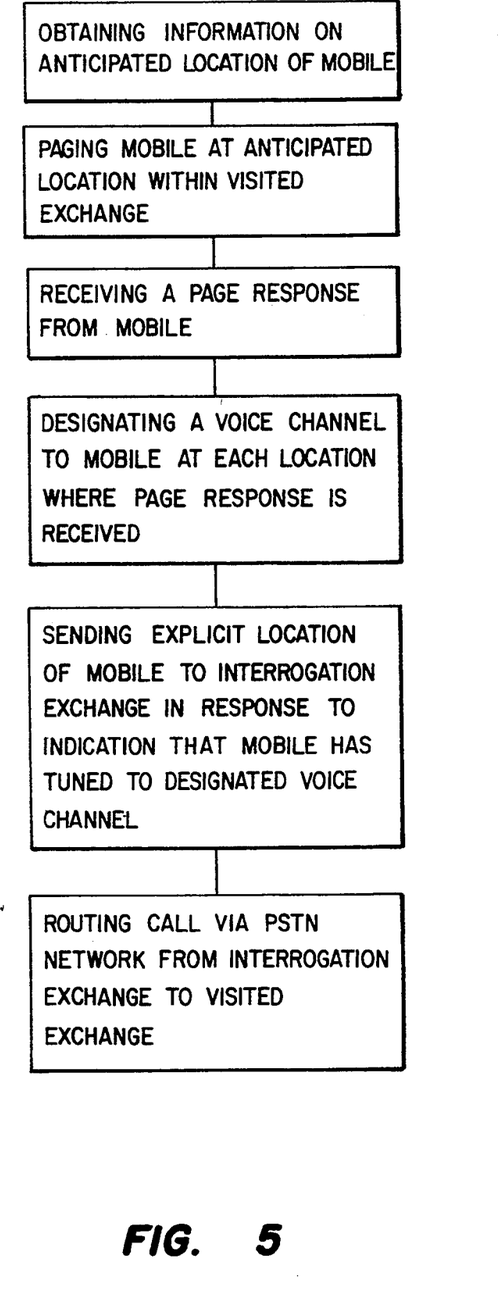

The page requests for the extended paging areas could be initiated concurrently with the ongoing internal paging process, or the additional page requests could be initiated after the internal paging process is complete. If the extended paging area also covers more than one exchange, each page request could be sent in sequence or in parallel An additional benefit of the routing system of the present invention is illustrated in FIG. 4 which reflects the possibility that a mobile which receives a page from the paging exchange can actually answer in a non-paging exchange. The exchange which receives the page response will order the mobile to tune to a voice channel. If the voice channel designation is confirmed, the home exchange is then informed of the mobile's location and the incoming call is routed to the correct exchange, as described above.

FIG. 4 illustrates a factor that should be considered in the routing system of the present invention which is unknown page response handling. Mobile stations re-scanning into other exchanges at page response are commonly directed back into the exchange where the system believes they came from with the help of "directed retry for unknown page response" routines. Such treatment is not optimal because of several reasons. First of all, it is the mobile station's specified right and duty to always send in its accesses on the strongest possible access channel, without taking such things as exchange borders into account. When a directed retry is sent beck to the mobile station, not only is the mobile station sent to a cell that it did not consider to be the best, but there is also a risk that the mobile station will be lost and the call opportunity lost at the same time.

When the routing system of the present invention is in use, it is fairly straightforward to take better care of this type of mobile station access. Since the system knows that the responding mobile station has apparently been paged and it is possible from the mobile station number to figure out who is waiting for a page response, that is, the home exchange, the home exchange can be informed that the mobile station is waiting on a voice channel. This process may be understood by reference again to FIG. 4. Assuming that a page is sent out from visited exchange V1 14, it is possible that the mobile station 12 will receive the page but answer in another exchange, for example, visited exchange V2 24, and be put on a voice channel. At that point, visited exchange V2 24 forwards the location of the mobile to the home exchange 8 which informs the interrogation exchange 4 which in turn routes the call to V2. Eventually, V1 will also inform the home exchange that the mobile has not answered the page in that exchange. The paging process for this particular mobile station has, however, already terminated (since it was located in V2) and the negative response from V1 is discarded. Such handling of unknown page responses can supercede the "directed retry for unknown page response" handling within current systems.

Another aspect of the present invention that should be considered is the handling of mobile stations during routing. Specifically, with respect to the handling of a mobile station after a page response, it should be understood that an attempt to put the mobile station on a voice channel is made after an exchange has received a page response from the mobile station. There are several reasons for this. First, one should not start to route the incoming call through the PSTN to an exchange that might have received a false access. If the mobile station turns up on a voice channel, the risk that the page response was a multiple access is reduced substantially. A second reason is to allow for long call routing times. After the mobile station has sent in its page response, it expects a response back from the system within 5 seconds. The possible responses can only be: (a) voice channel designation, (b) directed retry, or (c) release. One would not be able to successfully complete the call setup if the routing of the call takes longer than 5 seconds and if nothing is done on the control channel. Therefore, it is proper to put the mobile station on a voice channel where it can be kept for an indefinite length of time by sending frequent messages.

Obviously, numerous modifications and variations are possible in view of the above teachings. Accordingly, within the scope of the appended claims, the invention may be practiced otherwise than specifically described herein.

What is claimed is:

1. In a mobile communication system having a plurality of exchanges within which at least one mobile station may roam and which are connected with one another by PSTN lines, a method for routing an incoming call from an interrogation exchange to the called mobile station, comprising:

obtaining information as to the anticipated location of the mobile station;

paging the called mobile station in at least one of a plurality of locations based upon said anticipated location information in response to the receipt of an incoming call for said mobile station by said interrogation exchange;

receiving a page response from the paged mobile station at one of said plurality of locations;

designating to said mobile a voice channel to which to tune at said one of said plurality of locations in response to receiving a page response from the paged mobile;

sending information identifying the explicit location of the called and waiting mobile to the interrogation exchange via said private data lines in response to receiving an indication at said one of said plurality of locations that said mobile has tuned to he designated voice channel and is waiting on said voice channel; and routing the call for said mobile via said PSTN communications lines from said interrogation exchange to the exchange in which said mobile station is located and waiting on a voice channel in response to receipt of information identifying the explicit location of said mobile.

2. A mobile communications system comprising:

at least one mobile station;

a home exchange associated with said at least one mobile station;

one or more additional exchanges within which said at least one mobile station may be presently located;

means for maintaining information indicative of where said at least one mobile station may be located;

private data lines connecting said home and one or more additional exchanges for passing signals therebetween;

PSTN communications lines connecting said exchanges;

paging means, responsive to receipt of a call by an interrogation exchange directed to said at least one mobile station, for selectively paging said at least one mobile station in at least one of a plurality of locations in said home exchange and said one or more additional exchanges;

means at each of said plurality of locations for receiving a page response from the paged mobile station;

means at each of said plurality of locations and responsive to receiving a page response from the paged mobile for designating to said mobile a voice channel to which to tune;

means responsive to receiving an indication at one of said plurality of locations that said mobile has tuned to the designated voice channel and is waiting on said voice channel, for sending information identifying the explicit location of the called and waiting mobile to the interrogation exchange via said private data lines; and means responsive to receipt of information identifying the explicit location of said mobile for routing the call for said mobile via said PSTN communications lines from said interrogation exchange to the exchange in which said mobile station is located and waiting on a voice channel.

3. A mobile communication system as set forth in claim 2, also including:

means responsive to a failure to identify the explicit location of said at least one mobile for notifying the calling party of failure of the call.

4. In a mobile communication system having a plurality of exchanges within which at least one mobile station may roam and which are connected with one another by both private data lines for passing signals therebetween and PSTN communications lines, a method for routing an incoming call from an interrogation exchange to the called mobile station, comprising:

obtaining information as to the anticipated location of the mobile station;

paging the called mobile station in at least one of a plurality of locations based upon said anticipated location information in response to the receipt of an incoming call for said mobile station by said interrogation exchange;

receiving a page response from the paged mobile station at one of said plurality of locations;

designating to said mobile a voice channel to which to tune at said one of said plurality of locations in response to receiving a page response from the paged mobile;

sending information identifying the explicit location of the called and waiting mobile to the interrogation exchange via said private data lines in response to receiving an indication at said one of said plurality of locations that said mobile has tuned to the designated voice channel and is waiting on said voice channel; and routing the call for said mobile via said PSTN communications lines from said interrogation exchange to the exchange in which said mobile station is located and waiting on a voice channel in response to receipt of information identifying the explicit location of said mobile.

5. A method for call routing as set forth in claim 4 wherein said anticipated location information is obtained from the home exchange of the called mobile station via said private data lines.

6. A method for call routing as set forth in claim 4 wherein said anticipated location information is obtained from a home location register.

7. In a telecommunications network comprising a first exchange connected to the public switched telephone network (PSTN), and a second exchange connected to a plurality of base stations having radio coverage areas in which a remote station is capable of receiving communication signals from said base stations, a method of routing communication signals from said PSTN to said remote station, said method comprising the steps of:

receiving at said first exchange a communication signal directed to said remote station;

requesting said second exchange to provide a routing number for use in routing said communication signal from said first exchange to said second exchange;

paging said remote station in at least one of said radio coverage areas;

detecting at said second exchange a page response transmitted from said remote station;

transmitting a channel assignment to said remote station after detection of said page response;

detecting at said second exchange a channel acknowledgement transmitted from said remote station;

transmitting, in response to the detection of either said page response or said channel acknowledgment, said routing number from said second exchange to said first exchange; and routing said communication signal from said first exchange to said second exchange using said routing number.

8. The method of claim 7 wherein said communication signal received at said first exchange is a telephone call.

9. The method of claim 7 wherein said communication signal is routed through the PSTN.

10. The method of claim 7 wherein:
said telecommunications network is a cellular radio network further comprising a third exchange;
said first exchange is an interrogation exchange;
said second exchange is a visited exchange;
said third exchange is a home exchange; and
said remote station is a mobile station associated with said home exchange and being served by said visited exchange.

11. The method of claim 10 wherein said interrogation exchange requests said home exchange to provide said routing number and said home exchange, in turn, requests said visited exchange to provide said routing number.

12. A radio communications network comprising:
a mobile station;
a home exchange associated with said mobile station;
a first visited exchange having a radio coverage area in which said mobile station can roam;
an interrogation exchange connected to the public switched telephone network (PSTN);
wherein said home exchange includes:
means for identifying the exchange location of said mobile station; and
means for communicating with said visited and interrogation exchanges;
wherein said interrogation exchange includes:
means for receiving from said PSTN a call to said mobile station;
means for sending a request to said home exchange to provide a routing number for use in routing said call to said mobile station;
means for receiving said routing number from said home exchange; and
means for routing said call to said mobile station using said routing number;
wherein said first visited exchange includes:
means for receiving a request from said home exchange to provide said routing number;
means for sending a page to said mobile station upon the receipt of said routing number request from said home exchange;
means for detecting a page response from said mobile station;
means for sending a first channel designation to said mobile station upon the detection of said page response;
means for detecting a first channel confirmation from said mobile station; and
means for sending to said home exchange a first routing number corresponding to said first visited exchange upon the detection of either said page response or said first channel confirmation.

13. The network of claim 12 wherein said first visited exchange further includes means for requesting at least one other exchange to page said mobile station.

14. The network of claim 12 further comprising a second visited exchange which includes:
means for detecting said page response from said mobile station;
means for sending a second channel designation to said mobile station upon the detection of said page response;
means for detecting a second channel confirmation from said mobile station; and
means for sending to said home exchange a second routing number corresponding to said second visited exchange upon the detection of said second channel confirmation.

15. In a cellular radio network comprising a first exchange connected to the public switched telephone network (PSTN), and second and third exchanges each having a radio coverage area in which a mobile station may roam, a method for routing a call from said PSTN to said mobile station comprising the steps of:

receiving said call at said first exchange;

paging said mobile station in at least a part of said second exchange coverage area;

detecting in said third exchange coverage area a page response from said mobile station;

assigning in said third exchange coverage area a voice channel to said mobile station;

detecting in said third exchange coverage area a voice channel confirmation from said mobile station;

sending, in response to the detection of either said page response or said channel confirmation, a routing number from said third exchange to said first exchange; and routing said call from said first exchange to said third exchange using said routing number.

16. The method of claim 15 wherein said mobile station is associated with a home exchange which maintains location information on said mobile station, and said method further comprises the step of sending a location update from said third exchange to said home exchange.

17. The method of claim 15 wherein said routing number is used to route the call through said PSTN.

18. A mobile communications system in which at least one mobile station may roam, said system comprising:

a home exchange of said at least one mobile station;

at least one visited exchange having a coverage area in which said mobile station may roam;

an interrogation exchange for receiving incoming calls for said mobile station;

private data lines connecting said home, visited and interrogation exchanges for passing signals therebetween;

PSTN communications lines connecting said interrogation and visited exchanges;

means for obtaining information as to the anticipated location of the called mobile station;

means responsive to the receipt of an incoming call for said mobile station by said interrogation exchange for paging the called mobile station in at least one of a plurality of locations based upon said anticipated location information;

means at each of said plurality of locations for receiving a page response from the paged mobile station;

means at each of said plurality of locations and responsive to receiving a page response from the paged mobile for designating to said mobile a voice channel to which to tune;

means responsive to receiving an indication at one of said plurality of locations that said mobile has tuned to a designated voice channel and is waiting on said voice channel for sending information identifying the explicit location of the called and waiting mobile to the interrogation exchange via said private data lines; and means responsive to receipt of information identifying the explicit location of said mobile for routing the call for said mobile via said PSTN communications lines from said interrogation exchange to the exchange in which said mobile station is located and waiting on a voice channel.

19. A mobile communications system as set forth in claim 18 wherein said paging means also includes:

means for issuing a paging request to a first exchange and said first exchange is said home exchange.

20. A mobile communications system as set forth in claim 18 wherein said paging means also includes:

means for issuing a page request to a first exchange and said first exchange is a visited exchange.

21. A mobile communication system as set forth in claim 18 wherein the called mobile is paged in said plurality of different locations simultaneously.

22. A mobile communication system as set forth in claim 18 wherein the called mobile is paged in said plurality of different locations sequentially.

23. A mobile communications system as set forth in claim 18 wherein said paging means also includes:

means for issuing a page request to a first exchange; and means within said first exchange for requesting other exchanges in an extended paging area to page the mobile.

24. A mobile communications system as set forth in claim 18 wherein said paging means also includes:

means for issuing a page request to a first exchange; and means within said first exchange for causing said home exchange to request other exchanges in an extended paging area to page the mobile.

25. A mobile communications system as set forth in claims 23 or 24 wherein the extended paging area covers the home exchange.

26. A mobile communications system as set forth in claims 22 or 24 wherein the extended paging area covers a plurality of cooperating exchanges.

* * * * *

UNITED STATES PATENT AND TRADEMARK OFFICE
CERTIFICATE OF CORRECTION

PATENT NO. : 5,369,684  
DATED : November 29, 1994  
INVENTOR(S) : Buhl, Nancy et al.

It is certified that error appears in the above-indentified patent and that said Letters Patent is hereby corrected as shown below:

| | |
|---|---|
| Abstract, line 4 | Replace "found," <br> With --found.-- |
| Column 1, line 6 | After "No." <br> Insert a space |
| Column 2, line 20 | Replace "-areas" <br> With --areas-- |
| Column 2, line 59 | After "system" <br> Insert a period |
| Column 2, line 64 | Replace "Skitara" <br> With --Shitara-- |
| Column 3, line 58 | After "note," <br> Insert --the-- |
| Column 6, line 54 | Replace "beck" <br> With --back-- |

UNITED STATES PATENT AND TRADEMARK OFFICE
CERTIFICATE OF CORRECTION

PATENT NO. : 5,369,684
DATED : November 29, 1994
INVENTOR(S) : Buhl, Nancy et al.

It is certified that error appears in the above-indentified patent and that said Letters Patent is hereby corrected as shown below:

Column 7, line 68        Replace "he" With --the--

Column 12, line 48        Replace "22" With --23--

Signed and Sealed this

Ninth Day of April, 1996

Attest:

BRUCE LEHMAN

*Attesting Officer*       *Commissioner of Patents and Trademarks*